United States Patent [19]

D'Alonzo

[11] 4,330,003
[45] May 18, 1982

[54] SELF-PROPORTIONAL FLUID METERING DEVICE ACTUATED BY A PRESSURIZED FLUID

[76] Inventor: Lodovico D'Alonzo, No. 27, Largo Alessandro Vessella, Rome, Italy

[21] Appl. No.: 267,106

[22] Filed: May 26, 1981

Related U.S. Application Data

[63] Continuation of Ser. No. 107,682, Dec. 27, 1979, abandoned.

[30] Foreign Application Priority Data

Jan. 5, 1979 [IT] Italy .............................. 47545 A/79

[51] Int. Cl.³ ........................................... G05D 11/13
[52] U.S. Cl. ............................. 137/100; 137/101.19; 137/101.31
[58] Field of Search ................... 417/212, 395, 401; 137/486, 100, 101.19, 101.31, 625.21; 222/57

[56] References Cited

U.S. PATENT DOCUMENTS

| | | | |
|---|---|---|---|
| 246,467 | 8/1881 | Cridge | 137/625.21 |
| 1,055,781 | 3/1913 | Mitchell et al. | 137/625.21 |
| 1,753,662 | 4/1930 | Merker | 222/57 |
| 2,665,707 | 1/1954 | Stover | 137/486 |
| 2,675,758 | 4/1954 | Hughes | 417/395 |
| 2,844,167 | 7/1958 | Griswold | 137/625.21 |
| 3,549,048 | 12/1970 | Goodman | 222/57 |
| 3,552,428 | 1/1971 | Pemberton | 137/486 |

*Primary Examiner*—H. Jay Spiegel
*Attorney, Agent, or Firm*—Beveridge, DeGrandi & Kline

[57] ABSTRACT

Fluid is metered into a conduit by a device which includes a detector for detecting the flow rate in the conduit, an amplifier for producing a pneumatic pressure which is dependent on the flow rate sensed by the detector, a control unit having a control shaft connected to a control diaphragm which is subjected to the pneumatic pressure from the amplifier, a motor unit having a hydraulically-pulsated motor/diaphragm connected to a motor shaft which is aligned with and contacted by the control shaft, and a pumping unit having a pump diaphragm connected to the motor shaft to meter fluid into the conduit.

3 Claims, 5 Drawing Figures

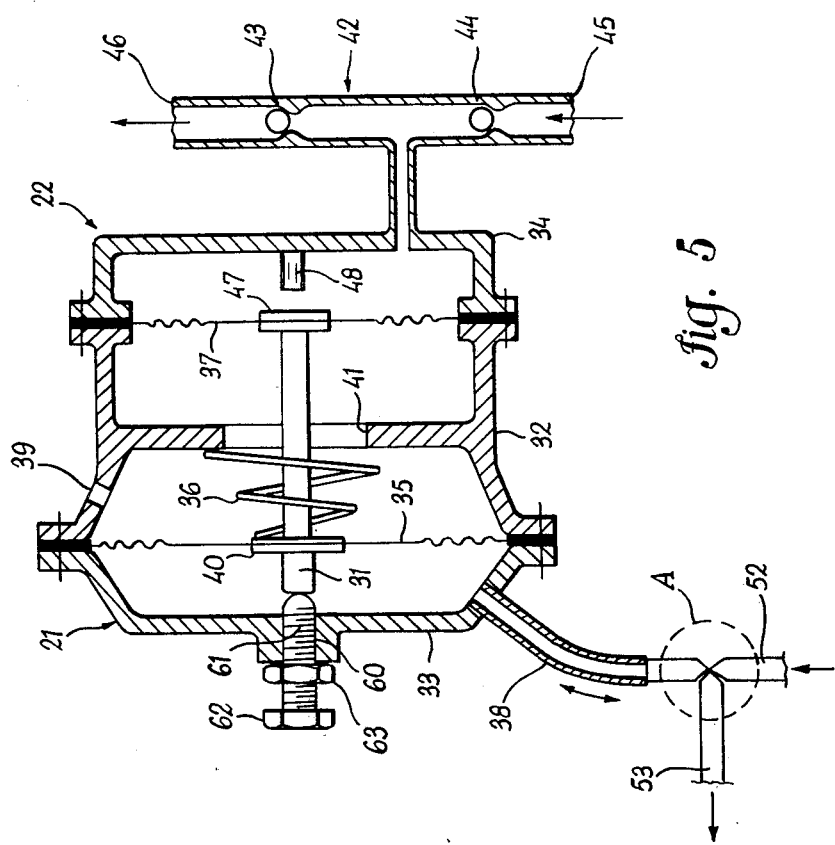

SELF-PROPORTIONAL FLUID METERING DEVICE ACTUATED BY A PRESSURIZED FLUID

This application is a continuation of application Ser. No. 107,682, filed Dec. 27, 1979, now abandoned.

BACKGROUND AND SUMMARY

The present invention relates to a self-proportional fluid metering device actuated by a pressurized fluid.

More in particular, the present invention relates to a fluid metering device of the abovementioned kind which in response to the flow of fluid in a conduit meters a predetermined quantity of fluid, possibly destined to be mixed with the fluid flowing in the conduit.

A specific field of use of the device according to the invention, reported as an example, is the metering of chlorine containing solutions in water conduits, operating so that downstream of the mixing point there is a constant chlorine concentration with the variation of the water flow in the main conduit.

BRIEF DESCRIPTION OF THE DRAWINGS

The present invention will be now disclosed with reference to embodiments presently preferred, as non limitative examples, and on the basis of the figures of the attached drawings, wherein:

FIG. 5 shows a second embodiment of the device according to the present invention.

DESCRIPTION OF THE PREFERRED EMBODIMENTS

Figure 1:
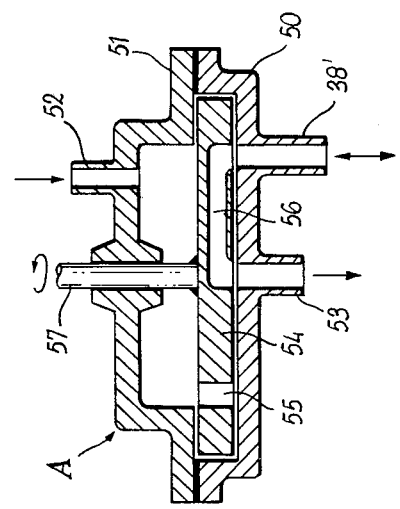
FIG. 1 shows a schematic view of a water conduit in which there is a fluid flow rate detector in association with a fluidic signal amplifier.

FIG. 1 shows a conduit such as a water conduit 10, within which a venturi 11 is mounted along with a static pressure pickup 12. Conduits 13 and 14, respectively connected to the venturi 11 and to the static pickup 12, lead to a signal amplifier 15, a known and commercially available device which modulates a fluid such as compressed air entering on the input 16 and departing on the output 17. Consequently, the flow rate of fluid in the conduit 10 determines the supply of compressed air at an outlet 17. The modulated compressed air available at 17 will control the operation of the metering device shown in FIG. 2 as will be shown in the following.

Figure 2:
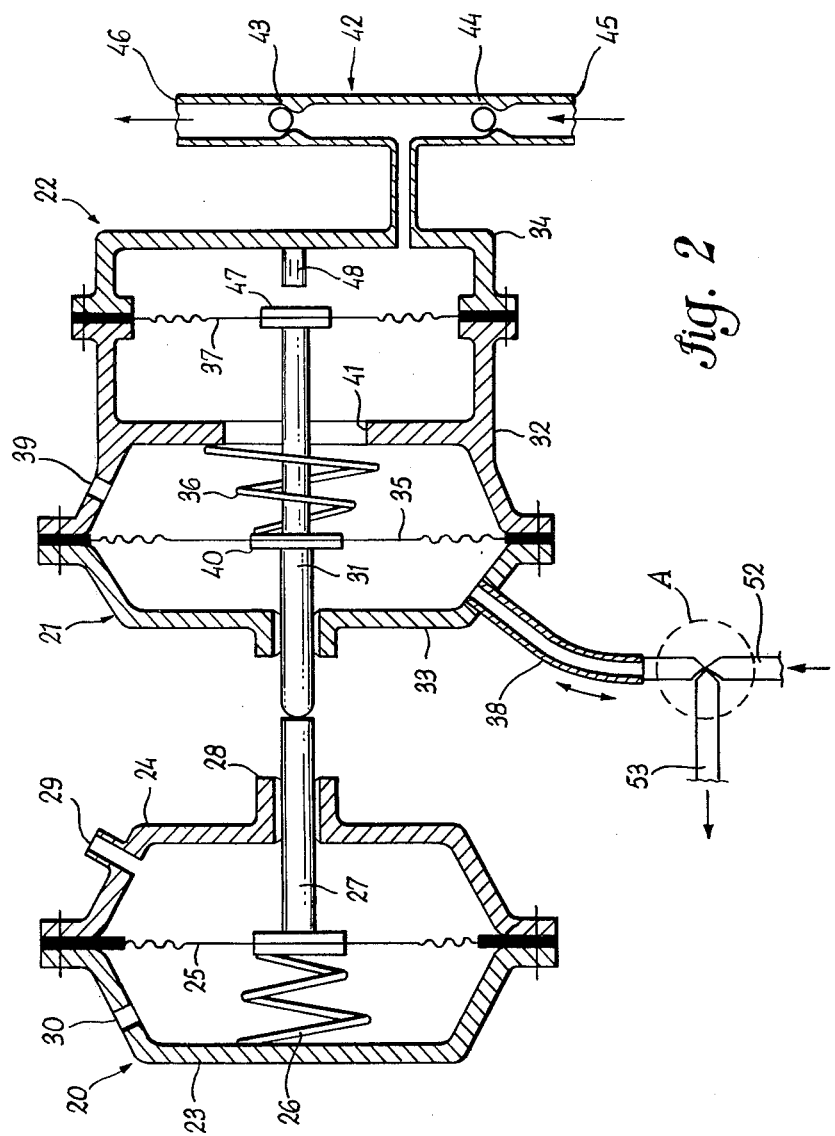
FIG. 2 shows a sectional view of the metering device itself according to the present invention.

With reference to FIG. 2, the metering device comprises a control unit 20, a motor unit 21 and a pumping unit 22.

The control unit 20 comprises a pair of caps 23 and 24, between which there is a flexible membrane or diaphragm 25 biased by a spring 26. The diaphragm 25 is moreover connected with a control shaft 27 slidably movable in a bushing 28 on the cap 24. The cap 24 is provided with a connection member 29 for a conduit which is connected to the output 17 of the fluidic amplifier so that the compressed air will bias the diaphragm 25 and shaft 27 toward the left. The cap 23 is provided with a vent 30 to prevent the buildup of counterpressures. It will be understood therefore that the shaft 27 will be displaced toward the left in an amount corresponding to the flow rate of water in the conduit 10.

The end of the control shaft 27 is contacted by the end of a motor shaft 31 which is part of the pumping and motor unit which will now be disclosed.

The pumping and motor unit comprises a body 32 and a pair of caps 33 and 34. Between the body 32 and the cap 33 there is a motor diaphragm 35 biased toward the left by a spring 36. Moreover, between the body 32 and the cap 34 there is a pump diaphragm 37 which, as will be shown, constitutes the pumping member for the fluid being metered into the conduit 10.

During the operation of a modulating valve A, hydraulic pressure is supplied and discharged through the conduit 38 which communicates with the chamber defined by the cap 33 and the diaphragm 35. The supply and discharge of hydraulic pressure by valve A displaces diaphragm 35 toward the right and permits its return to the left by the action of spring 36.

The space between the diaphragms 35 and 37 may eventually be filled with a hydraulic fluid such as oil introduced through the filling hole 39, so that a well defined volumetric correlation exists between the motor chamber (between diaphragm 35 and cap 33) and the pumping chamber (between diaphragm 37 and cap 34).

The motor shaft 31 is connected at 40 to the diaphragm 35 and it extends through the aperture 41 in the body 32 to the pump diaphragm 37, to which it is connected at 47. The oscillating motion of the shaft 31 is transmitted to the diaphragm 37, changing the volume of the pumping chamber between the cap 34 and the diaphragm 37. This performs a pumping action with the help of the arrangement 42 comprising the non-return valves 43 and 44. Consequently, fluid will be drawn in from the end 45 and expelled from the end 46.

The operation is as follows:

When the fluidic amplifier supplies pneumatic pressure to the conduit 29, the diaphragm 25 is shifted toward the left. The modulating valve A supplies and discharges hydraulic pressure through the conduit 38, giving an oscillating motion to the shaft 31 which consequently changes periodically the volume of the pumping chamber between the diaphragm 37 and the cap 34. This produces the pumping action previously disclosed. When the pressure in conduit 29 decreases, the shaft 27 will be shifted toward the right by the spring 26. This shifting of shaft 27 imposes a limitation on the stroke of shaft 21 with a consequent decrease of the volumetric displacement effected by the pump diaphragm 37. In the extreme case in which there is no pressure in conduit 29, the control shaft 27 will be shifted entirely toward the right, and the end 47 of the motor shaft 31 will abut against the pin member 48 on cap 34 to annul the pumping action.

It is therefore clear that the pumping rate of the unit 22 is variable and is a function of the pneumatic pressure in the conduit 29.

Figure 3:
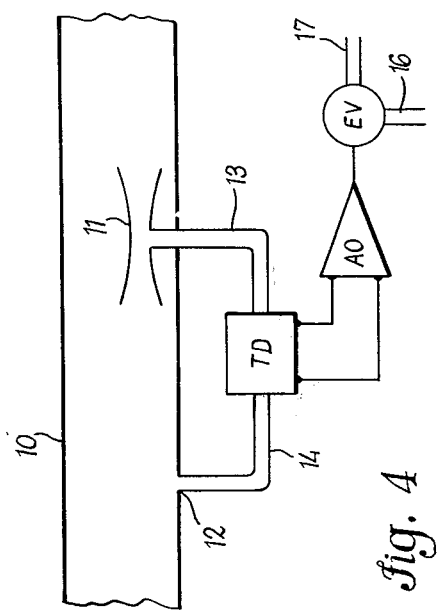
FIG. 3 shows a schematic view of a modulating valve.

Now, by way of illustrative example, a simplified embodiment of the modulating valve will be disclosed. As one may see from FIG. 3, the modulating valve A comprises a pair of caps 50 and 51 having, respectively, a conduit 38' corresponding to the conduit 38 of FIG. 2, a conduit 52 for the supply of pressurized hydraulic fluid and a discharge conduit 53. Between the two caps 50 and 51, there is a rotating disc 54 which has an aperture 55 and a U-shaped channel 56. The rotating disc 54 is connected to a shaft 57 which is driven, for example, by an electric motor or a power take-off from a water flow-rate counter. During its rotation the disc 54 will periodically place the aperture 55 in register with the exit of the conduit 38' so that the pressurized fluid passes toward the chamber located between the cap 33 and the diaphragm 35. Periodically, the disc will also place the conduit 38' in communication with the channel 56 and discharge 53. With the rotation of the disc 54, there is a periodic supply and discharge of pressurized hydraulic fluid to and from the chamber defined by the diaphragm 35 and cap 33 with a consequent motor action for controlling the pumping unit 22. It will be clear to a person skilled in the art that the modulating valve A may assume different embodiments.

Figure 4:
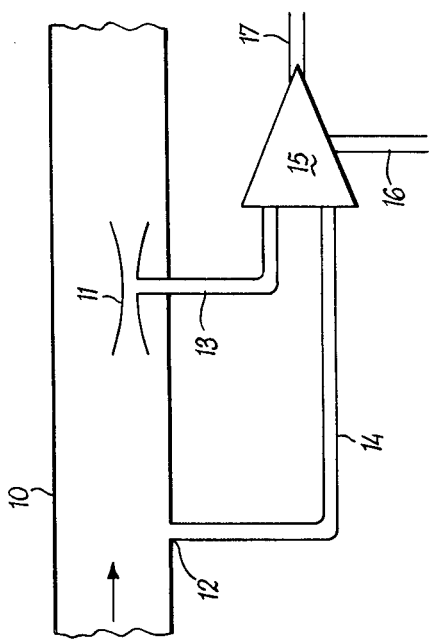
FIG. 4 shows a modified installation.

In FIG. 4 there is shown a different embodiment of the arrangement shown in FIG. 1, wherein the same reference numerals have been used for indicating corresponding parts. As one can see, the conduits 13 and 14 are brought to a differential transducer TD which controls an operational amplifier AO which in turn controls a modulating electrovalve EV. The operation will be clear to a person skilled in the art and it is practically identical to what has been disclosed with reference to FIG. 1.

In FIG. 5 there is shown a simplified embodiment of the metering device of FIG. 2, particularly useful for the use with small diameter conduits, wherein it is not necessary to provide a wide range modulation of the metered fluid as a function of the flow rate in the conduit.

As one can see from FIG. 5, wherein the same reference numerals of FIG. 2 have been used for indicating corresponding parts, in the cap 21 there is provided a threaded bushing 60 in which there is threaded a bolt 61 for the adjustment of the swing of the shaft 31. The bolt 61 is provided with an adjustment nut 62 for the adjustment during the setup and a set nut 63.

In this embodiment the modulating valve indicated in its whole with A is directly driven by a power take-off from a water flow rate counter (not shown).

The present invention has been disclosed with reference to embodiments which are presently preferred, shown as illustrative and non limitative examples. It will be understood that in practice variations and changes may be introduced by a person skilled in the art without departing from the scope of the invention.

I claim:

1. A fluid metering device, comprising,
   detecting means for detecting the flow rate of a first fluid in a conduit;
   amplifier means operatively connected to said detecting means for delivering a pneumatic pressure which is dependent on the flow rate of said first fluid as detected by the detecting means;
   a control unit having a control diaphragm, a control shaft and a first spring, said control diaphragm being exposed to and urged by said pneumatic pressure against said first spring, said control shaft being connected to said control diaphragm;
   a motor unit having a motor diaphragm, a motor shaft and a second spring, said motor diaphragm having one face thereof exposed to a hydraulic fluid which periodically urges the diaphragm against the action of said second spring; said motor shaft being connected to said diaphragm and being operatively engageable by said control shaft;
   a pumping unit having a pump diaphragm and a stop member, said pump diaphragm being connected to the motor shaft, said stop member being positioned to abut the motor shaft when the motor shaft is given a maximum displacement by said control shaft and said first spring means; said control shaft comprising a variable stop member whose position is dependent upon the flow rate of said first fluid, said position determining the displacement of said pump diaphragm; and
   a continuously operating modulating means operating at a substantially constant speed for periodically supplying hydraulic pressure to said motor unit to cause said pump diaphragm to pump a second fluid with a pumping action which is dependent on said pneumatic pressure and thus on the flow rate of said first fluid.

2. A fluid metering device as claimed in claim 1, wherein said modulating means includes a distribution element for delivering hydraulic pressure to said motor unit at regular time intervals, and a separate driving unit for continuously operating the distribution element.

3. A fluid metering device as claimed in claim 2, wherein said modulating means includes a housing having an upper cap and a lower cap, said upper cap having an input for supplying a pressurized hydraulic fluid to said upper cap, said lower cap having an output for discharging said hydraulic fluid and a conduit connected to said motor unit, said distribution element including a rotary disc arranged within said lower cap and provided with a shaft projecting from said housing and connected to said driving unit, said disc having a hole periodically connecting said upper cap with said conduit to supply said motor unit with said hydraulic fluid and a U-shaped channel for periodically interconnecting said conduit and said output to discharge hydraulic fluid from said motor unit.

* * * * *